Nov. 19, 1957  H. D. DAVIS  2,813,734
LINE SPLICE
Filed Sept. 14, 1953
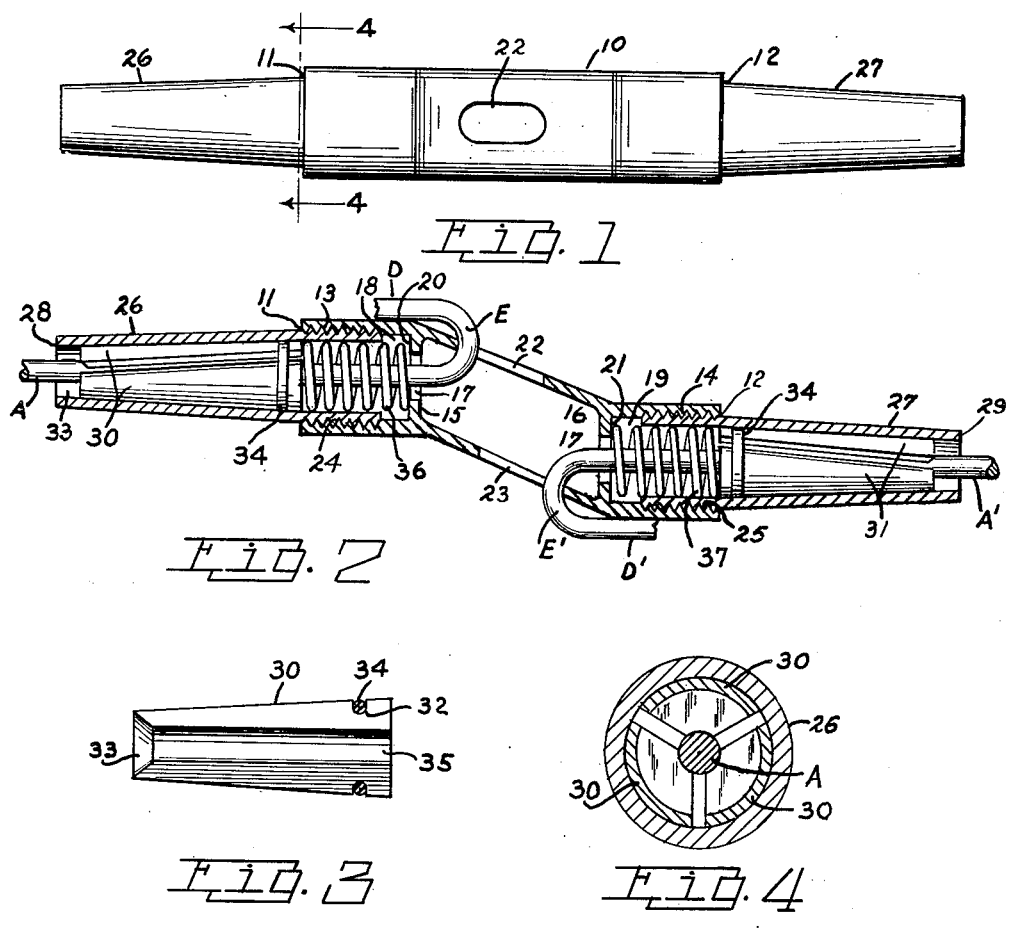
INVENTOR
HAROLD D. DAVIS
BY
J. B. Dickman, Jr.
ATTORNEY

2,813,734
LINE SPLICE

Harold D. Davis, Hermosa Beach, Calif.

Application September 14, 1953, Serial No. 379,836

1 Claim. (Cl. 287—75)

The present invention relates to a line splice and more particularly to an improvement of a line splice of the type disclosed in my Patent 2,652,273.

An object of the present invention is the provision of a line splice so constructed that it may be used over and over again.

Another object of the present invention is the provision of a housing having detachable ends.

A still further object of the present invention is to facilitate the securing of the lines in the connecting member and to enable the lines to be firmly anchored therein.

A still further object of the present invention is the provision of a line splice that will prevent the connected ends of a line from separating from a line splicer.

The above and other objects of the present invention may be attained by employing this invention which embodies among its features a pair of laterally spaced elongated hollow frustoconical socket members, each having a threaded end, a tubular body extending diagonally between the larger ends of the socket members and having in its end openings internal threads, and means within the socket members engaging the walls thereof for gripping cables introduced into the socket members through the smaller ends of the detachable frusto-conical socket members, and means encircling the means within the socket members serving as a holding means.

Other features include spring means within the sockets for engaging the cable gripping means and advancing them toward the smaller ends of the arms, to cause them to grip the cable, and openings extending through the tubular member through which the cables may be projected and bent to anchor the cables in the socket members.

Figure 1 is a side view of a line splice embodying the features of this invention.

Figure 2 is a longitudinal sectional view of the device.

Figure 3 is a plan view of one of the jaw members, and

Figure 4 is an enlarged transverse sectional view taken on line 4—4 of Figure 1.

Referring to the drawing in detail, the line splice herein referred to comprises a diagonal tubular body 10, the open ends 11 and 12 being provided with internal threads 13 and 14 respectively. Inwardly disposed from the open ends 11 and 12 are annular flanges 15 and 16 respectively, each having an aperture 17 the flanges forming socket 18 and 19, and stops 20 and 21, the purpose of which will hereinafter appear. Extending through opposite sides of the tubular body adjacent the flanges 15 and 16 are elongated longitudinal slots 22 and 23 the purpose of which will hereinafter appear.

The internal threads 13 and 14 receive the external threads 24 and 25 respectively of the frusto-conical arms 26 and 27 for locking engagement with the internal threads 13 and 14 in the diagonal body 10.

Mounted within the frusto-conical arms 26 and 27 respectively between the flanges 15 and 16 and the smaller ends 28 and 29 of the respective arms 26 and 27 for longitudinal movement in the respective arms are groups 30 in arm 26, and groups 31 in arm 27 of cable gripping jaws, each comprising three elongated jaws of substantially triangular cross-section which taper longitudinally throughout substantially their entire length so that as they advance toward the smaller ends of their respective arms they will be moved radially toward one another. Each jaw member of each group is provided with a groove 32 adjacent its larger end, and at its smaller end with an inclined guide face 33. The grooves 32 in each group of jaws receive a rubber ring 34 that serves to hold the jaws of each group together in the frusto conical arms. The concave side 35 of each jaw serves to accommodate a cable A and A' when the latter are extended axially between the groups of jaws.

Compression coil springs 36 and 37 are contained in the respective sockets 18 and 19, and bear respectively on the flanges 15 and 16 and on the groups of jaws 30 and 31 to yieldingly urge the respective groups of jaws toward the smaller end of their respective sockets.

In use, a cable A entered into the frusto-conical arm 26 will be guided by the guide faces 33 and will move the group of jaws 30 against the effort of spring 36 toward the larger end of the frusto-conical arm 26 until the jaws in group 30 expand and permit the cable A to pass between them and longitudinally through the spring 36, through aperture 17 in flange 15, and through slot 22. When the cable A has thus been moved under influence of the spring 36, and engagement of the jaws with the inner inclined wall of the frusto conical arm 26 the cable A is locked against extraction from the frusto conical arm 26. The end D of cable A protruding through the slot 22 is bent backwardly to form a hook E which will cooperate with the group of jaws in holding the cable C in place. The cable A' is entered into the frusto-conical arm 27 and guided by the guider faces 33 and will move the group of jaws 31 toward the larger end of the frusto-conical arm 27 until the jaws in group 31 expand and permit the cable A' to pass between them and longitudinally through spring 37, through aperture 17 in flange 16 and through slot 23. When the cable A' has thus been moved under the influence of the spring 36, and engagement of the jaws with the inner inclined wall of the frusto-conical arm 27, the cable A' is locked against extraction from the frusto-conical arm 27. The end D' of cable A' protruding through slot 23 is bent backwardly to form a hook E' which will cooperate with the group of jaws in holding the cable C' in place. One end of coil springs 35 and 36 respectively seat or impinge one wall respectively of stops 20 and 21.

From the foregoing description, when taken in connection with the accompanying drawing, the advantages of the construction and operation will be apparent to those skilled in the art to which the invention appertains, and I desire to have it understood that the device shown is merely illustrative and that such changes may be made within the scope of the claim hereto appended.

What is claimed is:

In a line splice comprising a body having a center and end portions, a bore extending completely therethrough said center and said end portions, slots in said body in opposite sides thereof, internal flanges in said body inwardly of the open ends of said body, a pair of hollow frusto-conical socket members parallel to each other and detachably secured to said body and each having a bore therein, said body extending diagonally between said frusto-conical socket members, cable gripping means in said frusto-conical socket members, the axes of said flanges and said frusto-conical socket members being in substantially in the same plane and in alignment with said slots whereby, the ends of a line to be spliced will pass through the respective flange openings and slots and by bending will be positively locked.

References Cited in the file of this patent

UNITED STATES PATENTS

| | | |
|---|---|---|
| 1,679,969 | Heese | Aug. 7, 1928 |
| 1,854,782 | Cook | Apr. 19, 1932 |
| 2,064,440 | Meeker | Dec. 15, 1936 |
| 2,078,051 | Berndt | Apr. 20, 1937 |

FOREIGN PATENTS

| | | |
|---|---|---|
| 103,751 | Switzerland | Mar. 17, 1924 |